Sept. 27, 1927.

H. WEICHSEL 1,643,327

ALTERNATING CURRENT MOTOR

Filed Nov. 2, 1925

INVENTOR
Hans Weichsel
BY E. E. Huffman
ATTORNEY

Patented Sept. 27, 1927.

1,643,327

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed November 2, 1925. Serial No. 66,154.

My invention relates to alternating current dynamo electric machines and particularly to multi-polar compensated synchronous and asynchronous alternating current motors, its object being to provide means for maintaining substantial equality between voltages appearing at brushes of like polarity and therefore avoiding cross-currents between such brushes. One of the causes of the inequalities in brush voltages which my invention is designed to prevent, is lack of air gap uniformity.

Figure 1:
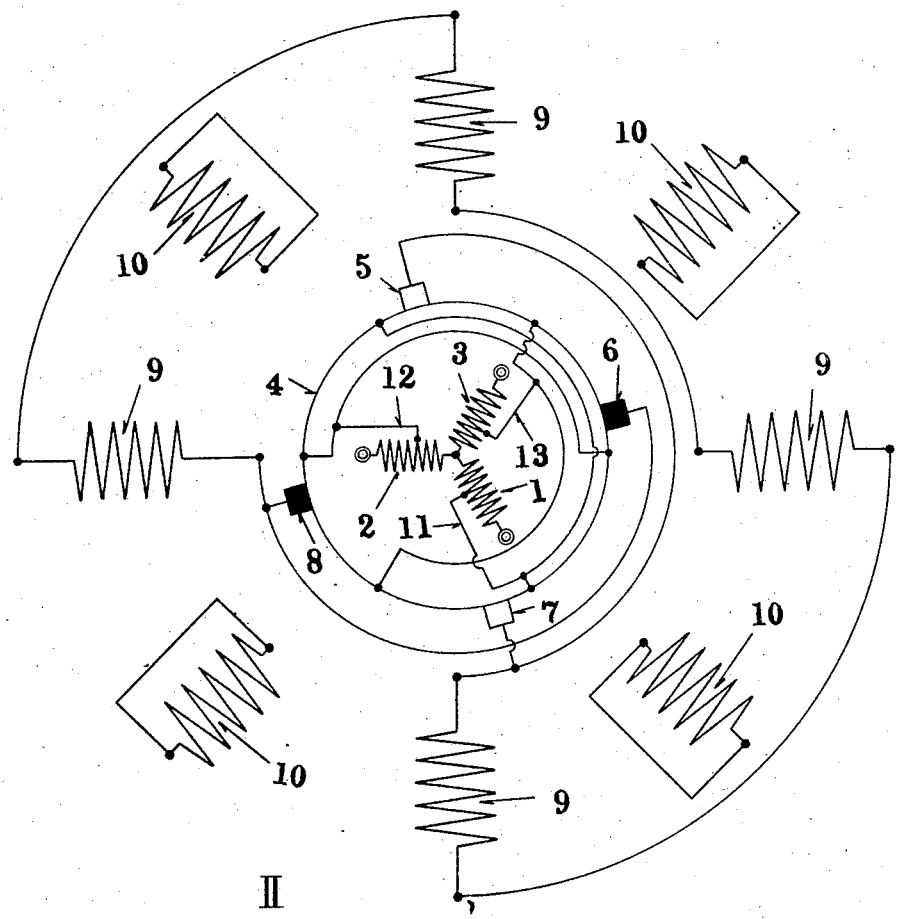
Figure 2:
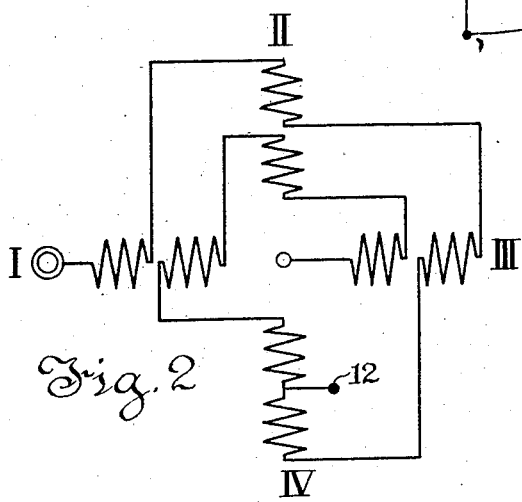

In the accompanying drawings Figure 1 diagrammatically illustrates a four-pole synchronous induction motor embodying my invention and Figure 2 is a diagram indicating the distribution of one of the phases of the polyphase winding on the rotor.

The rotor is provided with a four-pole three-phase winding 1, 2, 3 supplied with line current through slip rings, and with a four-pole commuted winding 4 with which brushes 5, 6, 7 and 8 cooperate, these brushes being connected in pairs to a four-pole exciting winding 9 on the stator. The commuted winding is of the parallel type. The stator is also provided with short-circuited starting windings 10 displaced 90 electrical degrees from the exciting winding.

Since the machine operates synchronously the main inducing winding 1, 2, 3 produces a field which is stationary in space, which field is cut by the conductors of the commuted winding 4 with the result that an E. M. F. is induced in the commuted winding. Any lack of uniformity in the air gap between the rotor and stator results in an uneven distribution over the poles of the machine of the total magnetic field; that is to say, the strength of the several poles will not be uniform whereby it will result that the E. M. F. appearing at positive brush 6, for example, differs from the E. M. F. appearing at the other positive brush 8 to which it is connected. This condition would result in useless and detrimental cross-currents between these brushes.

In order to avoid the condition just described I provide means for equalizing the pole strength which means, in the particular embodiment of my invention illustrated, comprises conductors 11, 12 and 13 connected at one end to taps on the windings 1, 2, 3 and at the other end to the commuted winding. Each of these conductors is connected to two points on the commuted winding of corresponding potential, and each of the points of connection of the conductors 11, 12 and 13 to the commuted winding is so selected that the phase of the induced E. M. F. appearing in the commuted winding at these points will be the same as the phase of the E. M. F. conductively impressed on the particular conductor 11, 12 or 13 which is connected to such points, and that the induced E. M. F. will be opposed in direction to the E. M. F. in the said conductors 11, 12 and 13.

From the arrangement just described it results that inequalities in induced voltages in different parts of the commuted winding will be substantially prevented. Each phase of the inducing winding to which a conductor 11, 12 or 13 is connected has a portion of its turns located on each pole of the machine, as indicated in Figure 2 with reference to phase 2 to which conductor 12 is connected, the reference characters I, II, III and IV indicating poles, and therefore the E. M. F. of rotation in the portions of windings 1, 2, 3 from which conductors 11, 12 and 13 are supplied is proportional to the entire field of the machine. In case the E. M. F. induced in the commuted winding by a particular pole differs from the E. M. F. of opposing direction in the conductor connected to that part of the commuted winding in that pole, a current will flow which will tend to increase or decrease the strength of the pole.

Having fully described my invention, what I claim as new and desire to secure by Letters Patent of the United States is:

1. An alternating current dynamo electric machine having one of its members provided with an inducing winding and with a commuted winding in inductive relation thereto, means for deriving an alternating current E. M. F. from the inducing winding and conductively impressing said E. M. F. on the commuted winding at points at which the E. M. F. induced in the commuted winding is co-phasal and opposed to said conductively impressed E. M. F.

2. A multipolar alternating current dynamo electric machine having one of its members provided with an inducing winding and with a commuted winding, and means for deriving an alternating current E. M. F. from the inducing winding and conductively impressing said E. M. F. on the commuted winding at points at which the E. M. F. induced in the commuted winding is co-phasal and opposed to said conductively impressed E. M. F., said means for deriving the E. M. F. conductively impressed on the commuted winding comprising windings for each pole, all of which are connected in series.

In testimony whereof, I hereunto affix my signature, this 27th day of October, 1925.

HANS WEICHSEL.